(12) United States Patent
Trischler

(10) Patent No.: US 12,462,949 B2
(45) Date of Patent: *Nov. 4, 2025

(54) AUTOMOBILE WIRING HARNESS SYSTEM AND KIT FOR SAME

(71) Applicant: John Trischler, Greenwood, IN (US)

(72) Inventor: John Trischler, Greenwood, IN (US)

(73) Assignee: John Trischler, Greenwood, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/746,411

(22) Filed: Jun. 18, 2024

(65) Prior Publication Data

US 2024/0339244 A1   Oct. 10, 2024

Related U.S. Application Data

(63) Continuation of application No. 18/309,071, filed on Apr. 28, 2023, now Pat. No. 12,040,107, which is a continuation of application No. 17/661,190, filed on Apr. 28, 2022, now Pat. No. 11,699,537.

(60) Provisional application No. 63/180,913, filed on Apr. 28, 2021.

(51) Int. Cl.
*H01B 7/17* (2006.01)
*H02G 3/04* (2006.01)

(52) U.S. Cl.
CPC ............ *H01B 7/17* (2013.01); *H02G 3/04* (2013.01)

(58) Field of Classification Search
None
See application file for complete search history.

(56) References Cited

U.S. PATENT DOCUMENTS

| | | | | |
|---|---|---|---|---|
| 2,933,550 A * | 4/1960 | Cole | ............... | H02G 15/18 |
| | | | | 174/76 |
| 3,836,415 A * | 9/1974 | Hilderbrandt | .... | H01B 13/01254 |
| | | | | 338/214 |
| 4,280,062 A * | 7/1981 | Miller | ............... | B60Q 1/18 |
| | | | | 315/83 |
| 4,815,984 A * | 3/1989 | Sugiyama | ........... | B60R 16/0239 |
| | | | | 296/146.7 |
| 5,917,151 A * | 6/1999 | O'Brien | ............... | B60R 16/02 |
| | | | | 439/604 |
| 6,051,789 A * | 4/2000 | Kato | ............... | B29C 48/13 |
| | | | | 174/72 A |

(Continued)

*Primary Examiner* — Krystal Robinson
(74) *Attorney, Agent, or Firm* — Daniel C. Pierron; Widerman Malek, PL

(57) ABSTRACT

A wiring harness that includes a housing having proximal and distal openings, a plurality of electrical conductors extending from the proximal opening to the distal opening, a first universal connector having first and second ends, the first universal connector being electrically coupled at the first end to the first plurality of electrical conductors and the second end being configured to attach to at least one of an adapting member and a power source of an automobile, and a plurality of individual connectors comprising a first and second ends, each individual connector of the plurality of individuals connectors being electrically coupled at the first end thereof to an electrical conductor of the plurality of electrical conductors proximate to the distal opening, and the second end thereof being configured to attach to at least one of an adapting member, a power source of the automobile, and an electrical component of the automobile.

10 Claims, 7 Drawing Sheets

(56) References Cited

U.S. PATENT DOCUMENTS

| | | | |
|---|---|---|---|
| 6,531,657 B1* | 3/2003 | Jones, Jr. | H01R 31/06 |
| | | | 439/502 |
| 10,965,107 B2* | 3/2021 | Steinkamp | B60R 16/0207 |
| 2002/0047532 A1* | 4/2002 | Menze | B60Q 1/305 |
| | | | 315/82 |
| 2013/0161094 A1* | 6/2013 | Broughton | B60R 16/00 |
| | | | 174/88 R |
| 2015/0321625 A1* | 11/2015 | Sato | B60R 16/0215 |
| | | | 174/72 A |
| 2016/0152196 A1* | 6/2016 | Inao | H02G 3/0487 |
| | | | 174/72 A |
| 2019/0080821 A1* | 3/2019 | Tsukimori | H02G 3/0481 |

* cited by examiner

AUTOMOBILE WIRING HARNESS SYSTEM AND KIT FOR SAME

RELATED APPLICATIONS

This application is a continuation application of and claims priority under 35 U.S.C. § 120 of U.S. patent application Ser. No. 18/309,071 filed on Apr. 28, 2023 and titled Automobile Wiring Harness System and Kit for Same, which in turn is a continuation application of and claims priority under 35 U.S.C. § 120 of U.S. patent application Ser. No. 17/661,190, now U.S. Pat. No. 11,699,537, issued Jul. 11, 2023 filed on Apr. 28, 2022 and titled Automobile Wiring Harness System and Kit for Same, which in turn claims priority under 35 U.S.C. § 119 (e) of U.S. Provisional Patent Application Ser. No. 63/180,913 filed on Apr. 28, 2021 and titled Interconnecting, Buildable Wire Harness System for Lighting or Other Applications (Plug N Play). The contents of these applications are incorporated herein by reference.

FIELD OF THE INVENTION

The present invention relates to systems for modular automobile wiring harnesses.

BACKGROUND OF THE INVENTION

Aftermarket electrical rewiring of automobiles has historically depended on the manual creation of custom wiring for each automobile. The installer would be required to cut, crimp, and attach connectors to a length of wire place a protective housing around the wire between the connectors, and have to be familiar with the wiring layout of connectors for various manufacturers. This process is labor-intensive, significantly increasing the time necessary to complete such re-wiring and increasing the cost to the consumer. Moreover, the need for automobile technicians to have this skill increases the educational burden to become such a technician. Accordingly, there is a need in the industry for a system that facilitates aftermarket electrical rewiring of automobiles that reduces the time and manual labor needed to perform such rewiring.

This background information is provided to reveal information believed by the applicant to be of possible relevance to the present invention. No admission is necessarily intended, nor should be construed, that any of the preceding information constitutes prior art against the present invention.

SUMMARY OF THE INVENTION

With the above in mind, embodiments of the present invention are related to an automobile wiring harness system including a first wiring harness that may include: a housing having a proximal section and a distal section, the proximal section may include a proximal opening and the distal section may include a first distal opening; a first plurality of electrical conductors extending from the proximal opening to the distal opening; a first universal connector may include a first end and a second end, the first universal connector being electrically coupled at the first end to the first plurality of electrical conductors proximate to the proximal opening, and the second end being configured to attach to an adapting member; and a first plurality of individual connectors may include a first end and a second end, each individual connector of the first plurality of individuals connectors being electrically coupled at the first end thereof to an electrical conductor of the first plurality of electrical conductors proximate to the first distal opening, and the second end thereof being configured to attach to an electrical component of an automobile. The system also includes a first adapting member that may include: a first adapting portion configured to electrically couple to the second end of the first universal connector, a second adapting portion configured to electrically couple to an electrical power supply of an automobile, and one or more adapting electrical conductors configured to electrically couple the first adapting portion and the second adapting portion.

Implementations may include one or more of the following features. In some embodiments, the distal section may further include a second distal opening, a first subset of the first plurality of individual connectors are positioned proximate to the first distal opening, and a second subset of the first plurality of individual connectors are positioned proximate to the second distal opening. In some embodiments, the distal section may further include a first diverging section extending in a first direction and may include an opening defining the first distal opening, and a second diverging section extending in a second direction and may include an opening defining the second distal opening. The distal section may be in a y-configuration. The distal section may be in an L-configuration.

In some embodiments, the first plurality of individual connectors may be coupled to the first plurality of electrical conductors at a point of coupling between the first plurality of electrical conductors and the second universal connector. The plurality of individual connectors may include: a first subset of individual connectors electrically coupled to an electrical conductor of the first plurality of electrical conductors; and a second subset of individual connectors electrically coupled to an electrical conductor of the second plurality of electrical conductors.

In some embodiments, an electrical conductor of each of the first and second pluralities of electrical conductors is a grounding wire, and an individual connector of the first plurality of individual connectors is electrically coupled to the grounding wire of each of the first and second pluralities of electrical conductors.

In some embodiments, each of the housing and the first plurality of electrical conductors are flexible, permitting rotational displacement of the distal section relative to the proximal section.

The system may include: a second wiring harness may include: a housing having a proximal section and a distal section, the proximal section may include a proximal opening and the distal section may include a distal opening; a second plurality of electrical conductors extending from the proximal opening to the distal opening; a second universal connector may include a first end and a second end, the second universal connector being electrically coupled at the first end to the second plurality of electrical conductors proximate to the proximal opening, and the second end being configured to attach to an adapting member; and a second plurality of individual connectors may include a first end and a second end, each individual connector of the second plurality of individuals connectors being electrically coupled at the first end thereof to an electrical conductor of the second plurality of electrical conductors proximate to the distal opening, and the second end thereof being configured to attach to an electrical component of an automobile; and a second adapting member may include: a first adapting portion configured to electrically couple to the second end of the first universal connector; a second adapting portion configured to electrically couple to an electrical power supply of an automobile; and one or more adapting electrical conductors configured to electrically couple the first adapting portion and the second adapting portion. Implementations of the described techniques may include hardware, a method or process, or computer software on a computer-accessible medium.

Further embodiments of the invention are directed to an automobile wiring harness kit also includes at least one wiring harness may include: a housing having a proximal section and a distal section, the proximal section may include a proximal opening and the distal section may include a first distal opening; a first plurality of electrical conductors extending from the proximal opening to the distal opening; a first universal connector may include a first end and a second end, the first universal connector being electrically coupled at the first end to the first plurality of electrical conductors proximate to the proximal opening, and the second end being configured to attach to an adapting member; and a first plurality of individual connectors may include a first end and a second end, each individual connector of the first plurality of individuals connectors being electrically coupled at the first end thereof to an electrical conductor of the first plurality of electrical conductors proximate to the first distal opening, and the second end thereof being configured to attach to an electrical component of an automobile. The kit also includes at least one adapting member may include: a first adapting portion configured to electrically couple to the second end of the first universal connector, a second adapting portion configured to electrically couple to an electrical power supply of an automobile, and one or more adapting electrical conductors configured to electrically couple the first adapting portion and the second adapting portion. The kit also includes a container within which each of the at least one wiring harness and the at least one adapting member. Other embodiments of this aspect include corresponding computer systems, apparatus, and computer programs recorded on one or more computer storage devices, each configured to perform the actions of the methods.

Implementations may include one or more of the following features. In some embodiments, the at least one wiring harness comprised by the kit may further include the following features: the distal section further may include a second distal opening, a first subset of the first plurality of individual connectors are positioned proximate to the first distal opening, and a second subset of the first plurality of individual connectors are positioned proximate to the second distal opening.

In some embodiments, the distal section of the at least one wiring harness may include: a first diverging section extending in a first direction and may include an opening defining the first distal opening, and a second diverging section extending in a second direction and may include an opening defining the second distal opening. The distal section is in a Y-configuration. The distal section is in an L-configuration.

In some embodiments, the at least one wiring harness may further include: a second universal connector may include a first end and a second end, the second universal connector being electrically coupled at the first end to the first plurality of electrical conductors proximate to the first distal opening, and the second end being configured to attach to an adapting member; and the kit further may include a second adapting member that may include: a first adapting portion configured to electrically couple to the second end of the second universal connector; a second adapting portion configured to electrically couple to an electrical connector of the automobile; and one or more adapting electrical conductors configured to electrically couple the first adapting portion and the second adapting portion; where the first plurality of individual connectors is coupled to the first plurality of electrical conductors at a point of coupling between the first plurality of electrical conductors and the second universal connector. Colon> the at least one wiring harness further may include: a second plurality of electrical conductors extending from the proximal opening to the first distal opening; a second universal connector may include a first end and a second end, the first universal connector being electrically coupled at the first end to the second plurality of electrical conductors proximate to the proximal opening, and the second end being configured to attach to an adapting member; and the kit further may include a second adapting member may include: a first adapting portion configured to electrically couple to the second end of the second universal connector; a second adapting portion configured to electrically couple to an electrical connector of the automobile; and one or more adapting electrical conductors configured to electrically couple the first adapting portion and the second adapting portion; and the plurality of individual connectors may include: a first subset of individual connectors electrically coupled to an electrical conductor of the first plurality of electrical conductors; and a second subset of individual connectors electrically coupled to an electrical conductor of the second plurality of electrical conductors. Colon> an electrical conductor of each of the first and second pluralities of electrical conductors is a grounding wire, and an individual connector of the first plurality of individual connectors is electrically coupled to the grounding wire of each of the first and second pluralities of electrical conductors. Each of the housing and the first plurality of electrical conductors of the at least one wiring harness are flexible, permitting rotational displacement of the distal section relative to the proximal section.

Further embodiments of the invention may be directed to an automobile wiring harness kit including a first wiring harness may include: a housing having a proximal section and a distal section, the proximal section may include a proximal opening and the distal section may include a first distal opening and a second distal opening; a first plurality of electrical conductors extending from the proximal opening to the distal opening; a first universal connector may include a first end and a second end, the first universal connector being electrically coupled at the first end to the first plurality of electrical conductors proximate to the proximal opening, and the second end being configured to attach to an adapting member; and a first plurality of individual connectors may include a first end and a second end, each individual connector of the first plurality of individuals connectors being electrically coupled at the first end thereof to an electrical conductor of the first plurality of electrical conductors proximate to the first distal opening, and the second end thereof being configured to attach to an electrical component of an automobile, the first plurality of individual connectors may include: a first subset of individual connectors positioned proximate to the first distal opening; and a second subset of individual connectors positioned proximate to the second distal opening. The kit also includes a second wiring harness may include: a housing having a proximal section and a distal section, the proximal section may include a proximal opening and the distal section may include a distal opening; a second plurality of electrical conductors extending from the proximal opening to the distal opening; a second universal connector may include a first end and a second end, the second universal connector being electrically coupled at the first end to the second plurality of electrical conductors proximate to the proximal opening, and the second end being configured to attach to an adapting member; and a second plurality of individual connectors may include a first end and a second end, each individual connector of the second plurality of individuals connectors being electrically coupled at the first end thereof to an electrical conductor of the second plurality of electrical conductors proximate to the distal opening, and the second end thereof being configured to attach to an electrical component of an automobile. The kit also includes a plurality of adapting members, each adapting member of the plurality of adapting members may include: a first adapting portion configured to electrically couple to the second end of one of the first universal connector and the second universal connector, a second adapting portion configured to electrically couple to an electrical power supply of an automobile, and one or more adapting electrical conductors configured to electrically couple the first adapting portion and the second adapting portion. The kit also includes a container within which each of the first and second wiring harnesses and the at least one adapting member. The kit also includes a first subset of the first plurality of individual connectors are positioned proximate to the first distal opening. The kit also includes a second subset of the first plurality of individual connectors are positioned proximate to the second opening of the second distal section. Other embodiments of this aspect include corresponding computer systems, apparatus, and computer programs recorded on one or more computer storage devices, each configured to perform the actions of the methods.

BRIEF DESCRIPTION OF THE DRAWINGS

Some embodiments of the present invention are illustrated as an example and are not limited by the figures of the accompanying drawings, in which like references may indicate similar elements.

DETAILED DESCRIPTION OF THE INVENTION

Figure 1:
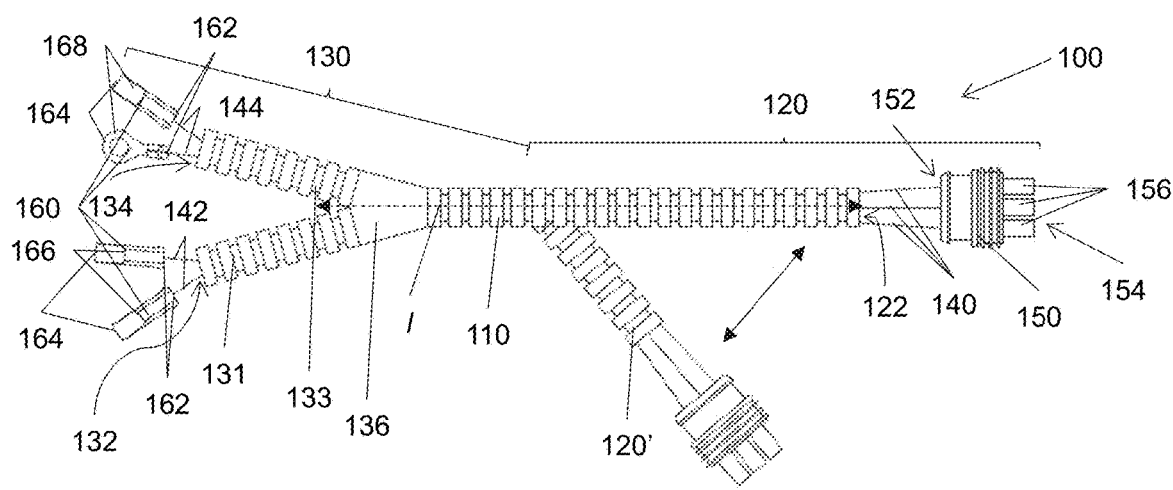
FIGS. 1-5 are top views of wiring harnesses according to embodiments of the invention.

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Those of ordinary skill in the art realize that the following descriptions of the embodiments of the present invention are illustrative and are not intended to be limiting in any way. Other embodiments of the present invention will readily suggest themselves to such skilled persons having the benefit of this disclosure. Like numbers refer to like elements throughout.

Although the following detailed description contains many specifics for the purposes of illustration, anyone of ordinary skill in the art will appreciate that many variations and alterations to the following details are within the scope of the invention. Accordingly, the following embodiments of the invention are set forth without any loss of generality to, and without imposing limitations upon, the claimed invention.

In this detailed description of the present invention, a person skilled in the art should note that directional terms, such as "above," "below," "upper," "lower," and other like terms are used for the convenience of the reader in reference to the drawings. Also, a person skilled in the art should notice this description may contain other terminology to convey position, orientation, and direction without departing from the principles of the present invention.

Furthermore, in this detailed description, a person skilled in the art should note that quantitative qualifying terms such as "generally," "substantially," "mostly," and other terms are used, in general, to mean that the referred to object, characteristic, or quality constitutes a majority of the subject of the reference. The meaning of any of these terms is dependent upon the context within which it is used, and the meaning may be expressly modified.

An embodiment of the invention, as shown and described by the various figures and accompanying text, provides an automobile wiring harness system. A system of the present invention may comprise a wiring harness and at least one adapting member. Various embodiments of wiring harnesses that are part of the invention are presented in FIGS. 1-4. A first wiring harness 100 according to an embodiment of the invention is presented in FIG. 1. The wiring harness 100 may comprise a housing 110. The housing 110 may be configured to provide protection for electrically conductive elements comprised by the wiring harness 100 between the connection points of the wiring harness 100. The housing 110 may be formed of any material suitable for use in an automotive environment. The material may be electrically isolative and resistant to chemical degradation. Additionally, the housing 110 may be formed of material that is sufficiently ductile and resilient to facilitate the bending thereof without degradation of the structural integrity of the housing. In some embodiments, the housing 110 may be formed from a polymeric material, including plastic material. The housing 110 may define a channel that runs along a longitudinal length of the housing 110 within which conductive elements of the wiring harness 100 may be positioned.

The housing 110 may comprise a proximal section 120 and a distal section 130. The proximal section 120 may comprise at least one proximal opening 122. The proximal opening 122 may enable a structure to pass therethrough and into the channel defined by the housing 110. While the present embodiment has a single proximal opening 122, it is contemplated and included within the scope of the invention that the proximal section 120 may comprise any number of openings.

Similarly, the distal section 130 may comprise at least one distal opening. The distal opening may enable a structure to pass therethrough and into the channel defined by the housing 110. In the present embodiment, the distal section 130 comprises a first distal opening 132 and a second distal opening 134. Each of the first and second distal openings 132, 134 may enable a structure to pass therethrough and into the channel defined by the housing 110. The first distal opening 132 may be comprised by a first diverging section 131 of the distal section 130 and the second distal opening 134 may be comprised by a second diverging section 133 of the distal section 130. The first diverging section 131 may extend in a first direction and the second diverging section 133 may extend in a second direction. In the present embodiment, the first diverging section 131 diverges from a longitudinal axis/of the wiring harness 100 in a first direction and the second diverging section 133 diverges from the longitudinal axis/in a second direction. The diverging of the first and second diverging sections 131, 135 may combine to form a Y-shaped configuration. In the present embodiment, the distal section 130 further comprises a diverging member 136 configured to transition the single-channel proximal section 120 to the dual-channel distal section 130 such that each of the first and second diverging sections 131, 133 and channels defined thereby may be in communication with the channel defined by the proximal section 120.

The wiring harness 100 further comprises a plurality of electrical conductors 140. The plurality of electrical conductors 140 may be lengths of electrically conductive material that passes through each of the proximal opening 122, the channel defined by the housing 110, and a distal opening, namely, at least one of the first distal opening 132 and the second distal opening 134. The plurality of electrical conductors 140 may be wrapped in an electrically isolative material to protect the conductor and reduce the chance of breaking, such has heat shrink wrapping. In the present embodiment, a first subset 142 of the plurality of electrical conductors 140 may pass through the first distal opening 132 and a second subset 144 of the plurality of electrical conductors 140 may pass through the second distal opening 134.

As mentioned above, the housing 110 may be made of a flexible material. Such flexibility may enable the rotational displacement of one of the proximal section 120 and the distal section 130 with respect to the other section. As shown in FIG. 1, the distal section 120 may be rotationally displaced to a new position 120'. All directions and degrees of rotation are contemplated and included within the scope of the invention.

The wiring harness 100 may further comprise one or more universal connectors. The present embodiment comprises a universal connector 150 positioned proximate to the proximal opening 122. The universal connector 150 comprises a first end 152 and a second end 154. The universal connector 150 may be configured to be electrically coupled to the plurality of electrical conductors 140 at or in proximity to the first end 152. Accordingly, the universal conductor 150 may comprise one or more electrical contacts (not shown) configured to facilitate electrical coupling with the plurality of electrical conductors 140. The second end 154 may comprise one or more ports 156 configured to mate with corresponding ports of another structure. The other structure may include, but is not limited to, an adapting member comprised by the system, a power source from an automobile in which the wiring harness 100 is being installed, or an electrical device comprised by the automobile to be powered by the wiring harness 100.

The wiring harness 100 may further comprise a plurality of individual connectors 160. The plurality of individual connectors 160 each comprise a first end 162 and a second end 164. The first end 162 may be configured to electrically couple to an electrical conductor of the plurality of electrical conductors 140. The coupling therebetween may be proximate to the distal opening from which the electrical connector passes through. The second end 164 may be configured to electrically couple to another structure. The other structure may include, but is not limited to, an adapting member comprised by the system, a power source from an automobile in which the wiring harness 100 is being installed, or an electrical device comprised by the automobile to be powered by the wiring harness 100.

In the present embodiment, the plurality of individual connectors 160 comprises a first subset of individual connectors 166 and a second subset of individual connectors 168. While two subsets are presented, it is contemplated and included within the scope of the invention that any number of subsets may be comprised by the plurality of individual connectors 160. The first subset of individual connectors 166 may be coupled to the first subset of electrical conductors 142 proximate to the first distal opening 132 and the second subset of individual connectors 168 may be coupled to the second subset of electrical conductors 144 proximate to the second distal opening 134. The first subset of individual connectors 166 comprises two single-pin connectors and the second subset of individual connectors 168 comprises a single-pin connector and a ground connector. It is contemplated and included within the scope of the invention that any number and any type of individual connectors may be comprised by the plurality of individual connectors 160 and the constituent subsets.

Figure 2:
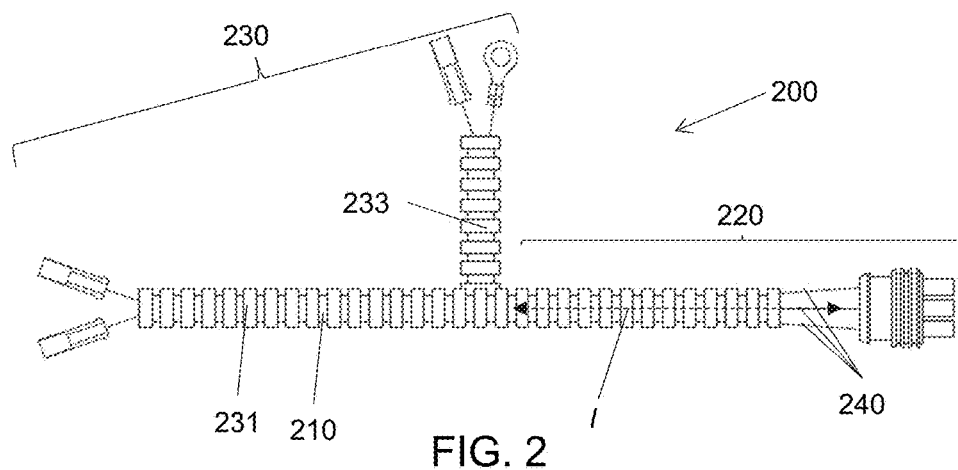

Referring now to FIG. 2, a wiring harness 200 according to another embodiment of the invention is presented. The wiring harness 200 comprises a housing 210 having a proximal section 220 and a distal section 320, a plurality of electrical conductors 240, a universal connector 250, and a plurality of individual connectors 260. The distal section 320 comprises first and second diverging sections 231, 233. The first diverging section 231 may be substantially coaxial with or parallel to longitudinal axis I and the second diverging section 233 may be orthogonal to longitudinal axis I, such that, taken together, the first and second diverging sections 231, 233 form an L-shaped configuration. In the present embodiment, the second diverging section 133 diverges at approximately midway along the length of the housing 110. It is contemplated and included within the scope of the invention that the second diverging section 133 may diverge at any point along the length of the housing 110.

Figure 3:
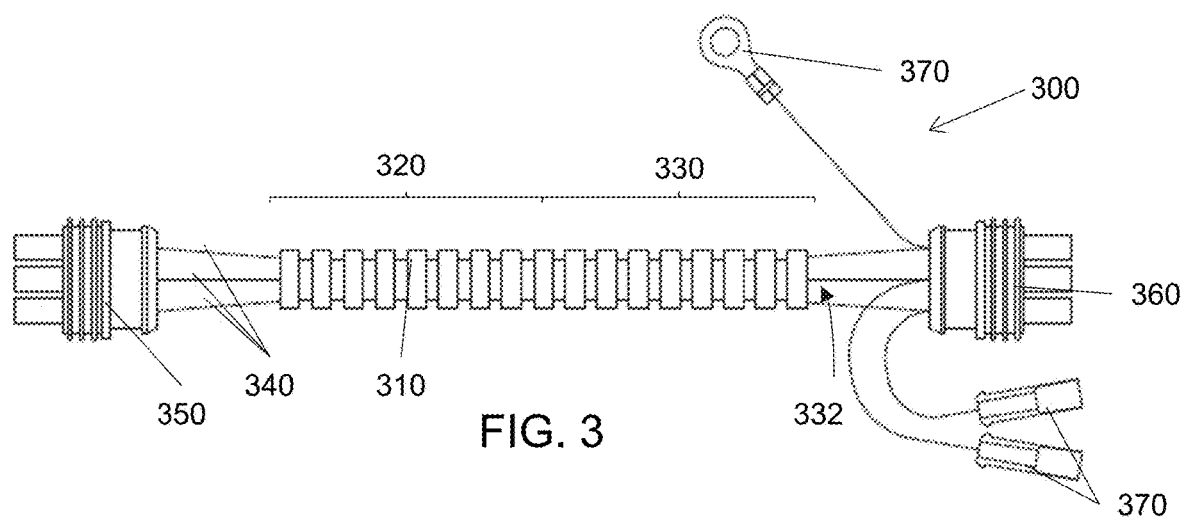

Referring now to FIG. 3, a wiring harness 300 according to another embodiment of the invention is presented. The wiring harness 300 comprises a housing 310 with proximal and distal sections 320, 330, a plurality of electrical conductors 340, and a first universal connector 350. The wiring harness 300 further comprises a second universal connector 360 electrically coupled to the plurality of electrical conductors 340 and positioned proximal to an opening 332 of the distal section 330. The wiring harness 300 further comprises a plurality of individual connectors 370. The plurality of individual connectors 370 are coupled to the plurality of electrical conductors 340 at or proximate to the point of coupling between the plurality of electrical conductors 340 and the second universal connector 360.

Figure 4:
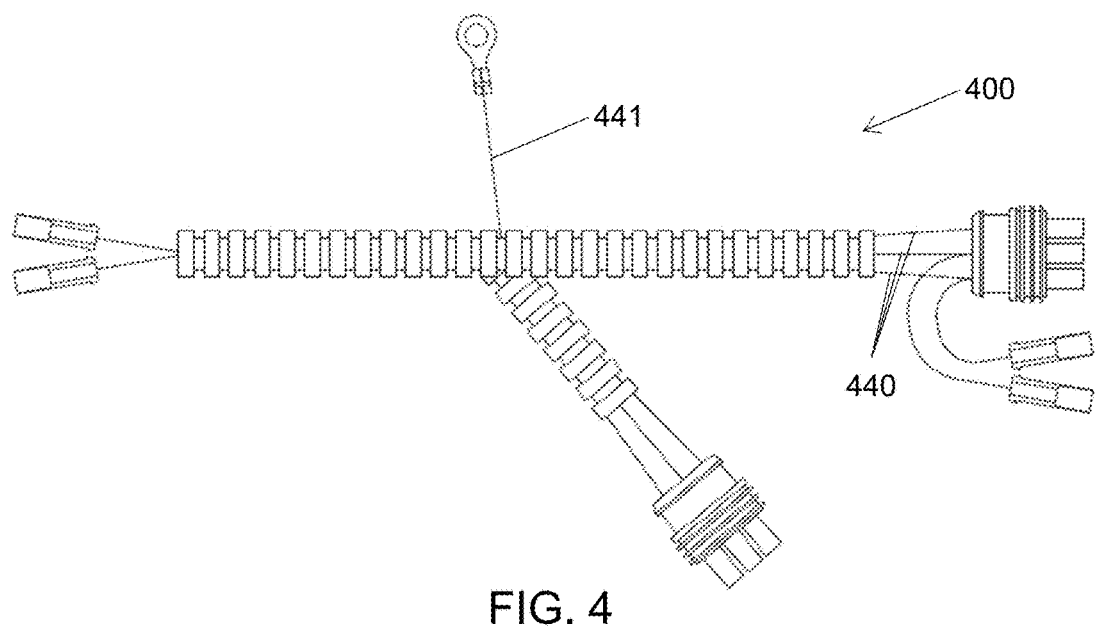

FIG. 4 presents a wiring harness 400 according to another embodiment of the invention. In the present embodiment, an electrical conductor 442 of a plurality of electrical conductors 440 may exit a housing 410 at a discrete opening therefor along the length of the housing 410.

Figure 5:
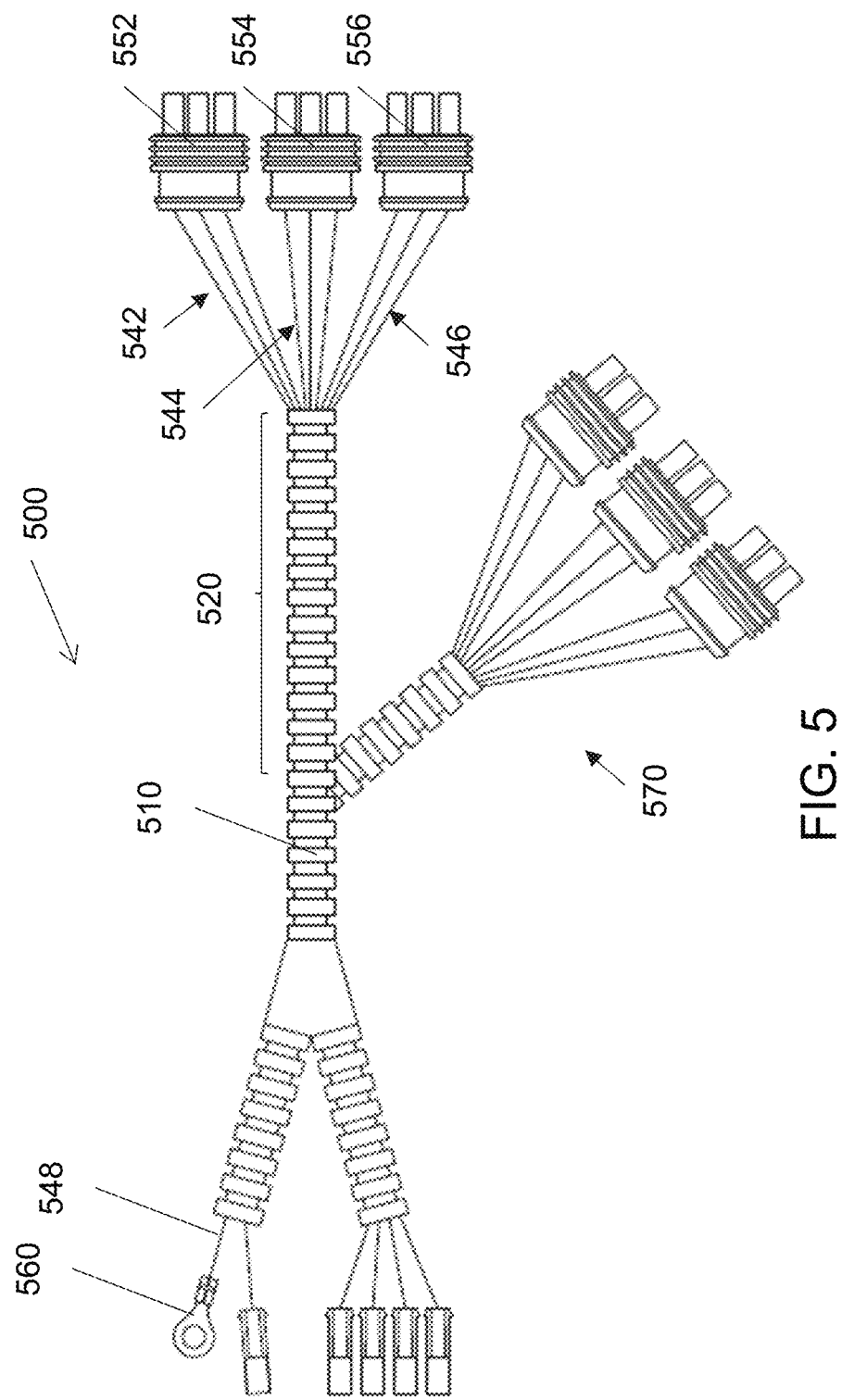

Referring now to FIG. 5, a wiring harness 500 according to an embodiment of the invention is presented. The wiring harness 500 comprises a housing 510 with a proximal section 520, a proximal opening 522, first, second, and third pluralities of electrical conductors 542, 544, 546, and first, second and third universal connectors 552, 554, 556 coupled to the respective first, second, and third pluralities of electrical conductors 542, 544, 546 proximate to the distal opening. The wiring harness 500 further comprises a grounding wire 548 with a ground individual connector 560 coupled thereto, wherein an electrical connector of each of the first, second, and third pluralities of electrical conductors 542, 544, 546 is a grounding wire and coupled to the ground individual connector 560 The wiring harness 500 may also comprise a second proximal section 570 having identical universal connectors and electrical conductors to the first proximal section 520. It is contemplated and included within the scope of the invention that any number of identical proximal and/or distal sections may be comprised by a wiring harness, and further that multiple proximal and/or distal sections may have differing connectors and/or electrical conductors.

While wiring harnesses 100, 200, 300, 400, and 500 are shown individually, a system according to an embodiment of the invention may comprise two or more wiring harnesses, of the same or varying embodiments.

Figure 6:
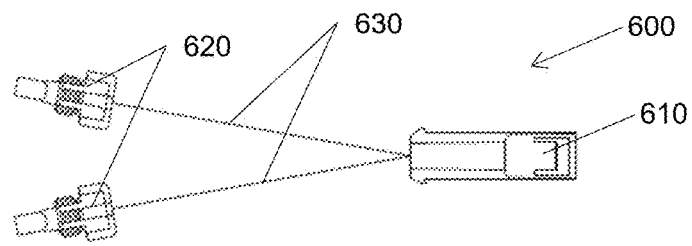
FIG. 6-18 are top views of adapting members according to embodiments of the invention.
Figure 7:
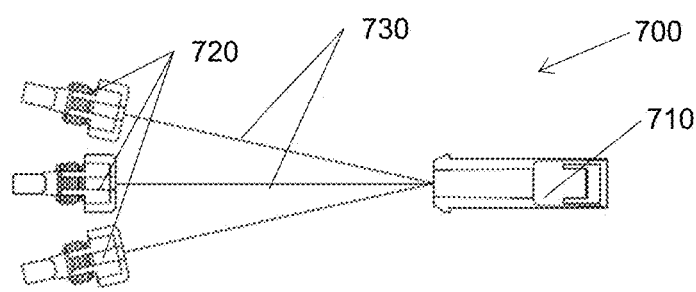

Referring now to FIG. 6, an adapting member 600 according to an embodiment of the invention is presented. The adapting member 600 may comprise a first adapting portion 610, a second adapting portion 620, and electrical connector (s) 630 configured to electrically couple the first and second adapting portions 610, 620. In the present embodiment, the first adapting portion 610 comprises a single connector configured to couple to a single-pin individual connector as shown in FIGS. 1-5. The second adapting portion 620 comprises two single-pin connectors, specifically waterproof connectors. The adapting member 600 further comprises two electrical connectors 630 coupling each of the two connectors of the second adapting portion 620 to the connector of the first adapting portion 610. Similarly, an adapting member 700 of FIG. 7 comprises a similar first adapting portion 710, a second adapting portion 720 with three single-pin waterproof connectors, and three electrical connectors 730 electrically coupling the first and second adapting portions 710, 720.

Figure 8:
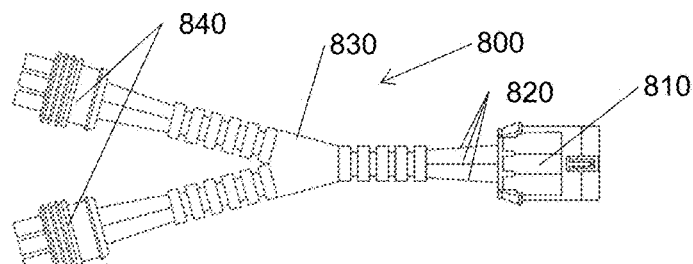
Figure 9:
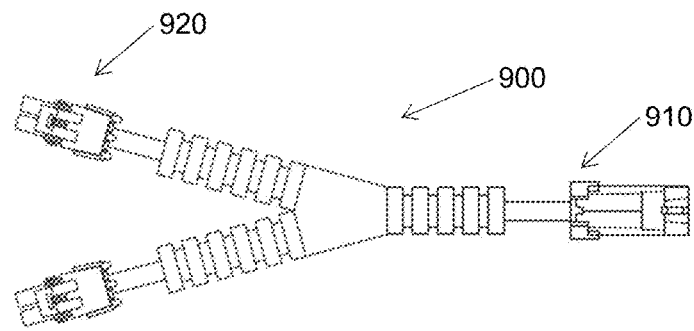
Figure 10:
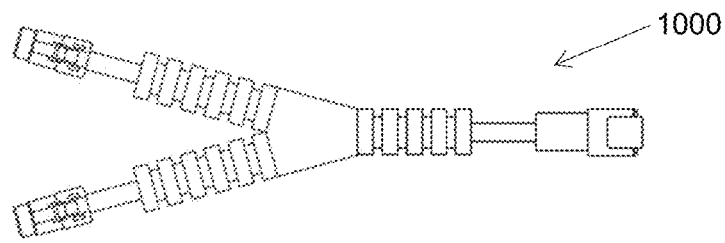
Figure 11:
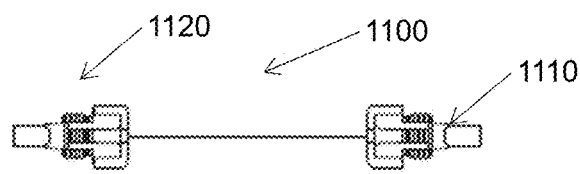
Figure 12:
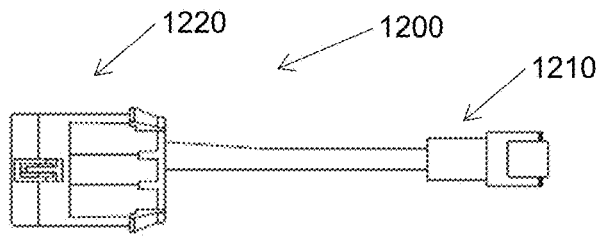
Figure 13:
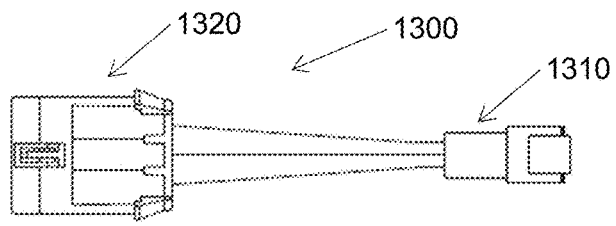
Figure 14:
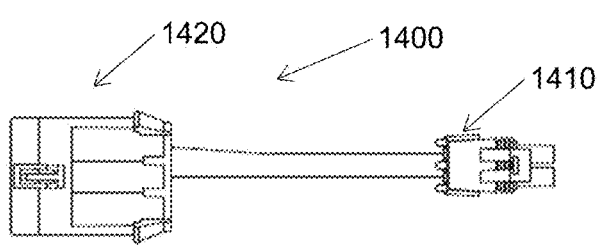
Figure 15:
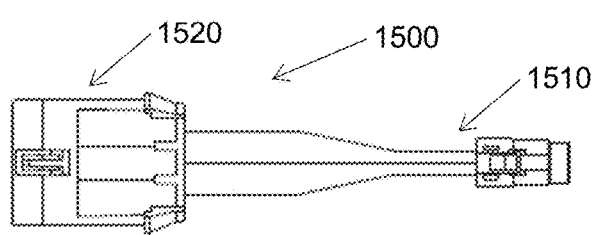
Figure 16:
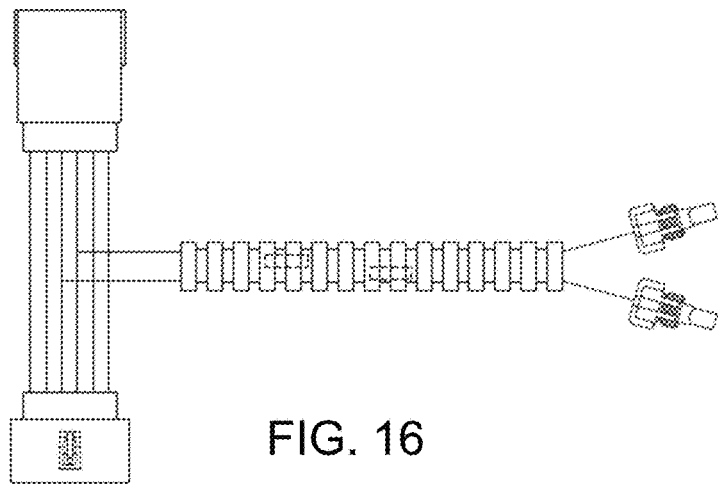
Figure 17:
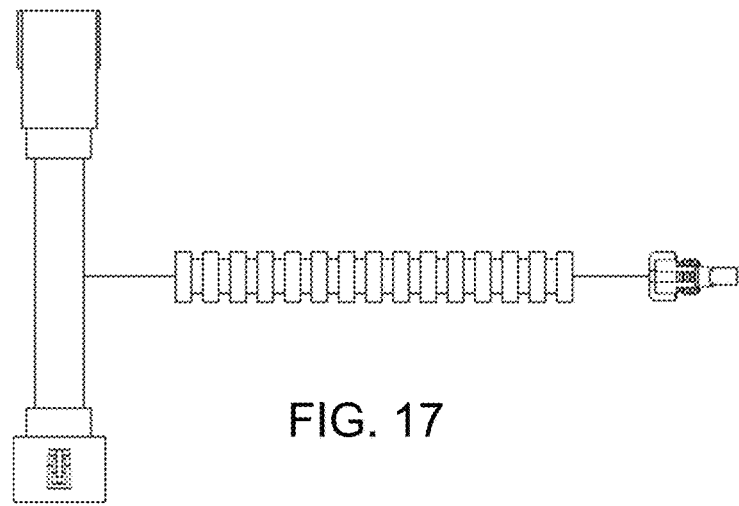
Figure 18:
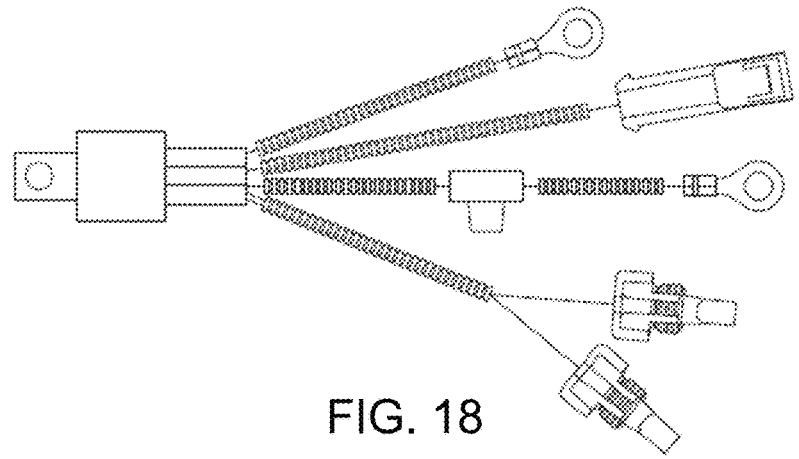

Referring now to FIG. 8, another adapting member 800 according to an embodiment of the invention is presented. The adapting member comprises a first adapting portion 810 in the form of a connector configured to couple to a universal three-pin connector as shown in FIGS. 1-5, a plurality of electrical connectors 820 coupled thereto, a housing 830 disposed around the plurality of electrical connectors 820, and a second adapting portion 840 comprising two universal three-pin connectors coupled to the plurality of electrical connectors 820. While three-pin universal connectors are shown herein and in FIGS. 1-5 above, it is contemplated and included within the scope of the invention that universal connectors with any number of pins are contemplated and included within the scope of the invention, including two pins and up to 99 pins, as well as connectors having a number of pins in excess thereof. FIG. 9 depicts an adapting member 900 having two-pin universal connectors for the first and second adapting portions 910, 920, specifically waterproof two-pin universal connectors. FIG. 10 depicts a similar adapting member having non-waterproof two-pin universal connectors. FIG. 11 depicts an adapting member 1100 comprising two single waterproof single-pin connectors for the first and second adapting portions 1110, 1120. FIG. 12 depicts an adapting member 1200 comprising a two-pin universal connector for the first adapting portion 1210 and a waterproof three-pin universal connector for the second adapting portion 1220. FIG. 13 depicts an adapting member 1300 comprising a three-pin connector as the first adapting portion 1310 and a waterproof three-pin adapter for the second adapting portion 1320. FIG. 14 depicts an adapting member 1400 comprising a two-pin waterproof connector as the first adapting portion 1410 and a three-pin connector for the second adapting portion 1420. FIG. 15 depicts an adapting member 1500 comprising a four-way connector for the first adapting portion 1510 and a three-pin connector for the second adapting portion 1520. FIGS. 16 and 17 depict adapting members for headlights and taillights, respectively, and FIG. 18 depicts an adapting member comprising a two-way single pin splitter with grounding and waterproof connectors.

While the adapting members of FIGS. 6-18 are shown individually, a system according to an embodiment of the invention may comprise two or more adapting members, of the same or varying embodiments.

Figure 19:
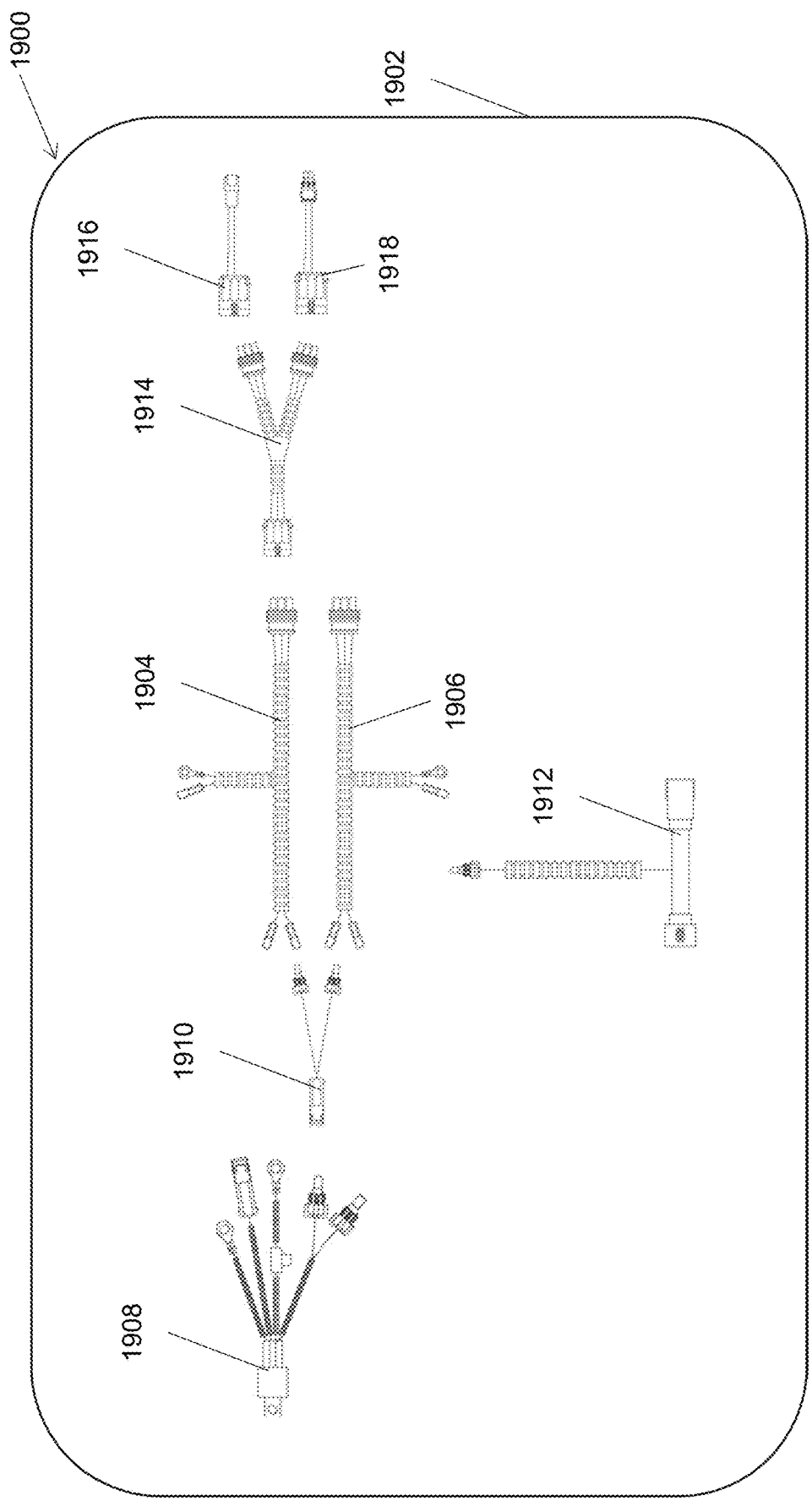
FIG. 19 is a view of a kit according to an embodiment of the invention.

FIG. 19 depicts a kit 1900 according to an embodiment of the invention. A kit may comprise at least one of the wiring harnesses described hereinabove and at least one adapting member as described hereinabove. Furthermore, a kit may comprise a container within which the wiring harness(es) and adapting member(s) comprised by the kit may be contained. Any number and variety of harnesses and adapting members are contemplated as being included by a kit according to embodiments of the invention. A single kit may comprise two or more harnesses of different configurations and two or more adapting members of different configurations. The kit 1900 of the present embodiment comprises a container 1902, two wiring harnesses 1904, 1906, and six adapting members 1908, 1910, 1912, 1914, 1916, 1918. A user may select from these harnesses and adapting members in the rewiring of one (or more) automobiles. The user may selectively couple the various elements of the kit 1900 to establish electrical connection between a power source in the automobile and the electrical componentry of the automobile to accomplish such rewiring without the above-described manual creation of electrical connectors. The harnesses and adapting members shown in the kit 1900 are non-limiting, and any of the harnesses and adapting members shown and described herein, and in any number and combination, may be included in a kit according to an embodiment of the invention.

Some of the illustrative aspects of the present invention may be advantageous in solving the problems herein described and other problems not discussed which are discoverable by a skilled artisan.

While the above description contains much specificity, these should not be construed as limitations on the scope of any embodiment, but as exemplifications of the presented embodiments thereof. Many other ramifications and variations are possible within the teachings of the various embodiments. While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include all embodiments falling within the scope of the appended claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

Thus the scope of the invention should be determined by the appended claims and their legal equivalents, and not by the examples given.

What is claimed is:

1. An automobile wiring harness system comprising:
   a first wiring harness comprising:
      a housing having a proximal section and a distal section, the proximal section comprising a proximal opening and the distal section comprising a first distal opening;
      a first plurality of electrical conductors extending from the proximal opening to the first distal opening;
      a first universal connector comprising a first end and a second end, the first universal connector being electrically coupled at the first end to the first plurality of electrical conductors proximate to the proximal opening, and the second end being configured to attach to at least one of an adapting member and a power source of an automobile; and
      a first plurality of individual connectors comprising a first end and a second end, each individual connector of the first plurality of individuals connectors being electrically coupled at the first end thereof to an electrical conductor of the first plurality of electrical conductors proximate to the first distal opening, and the second end thereof being configured to attach to at least one of an adapting member, a power source of the automobile, and an electrical component of the automobile.

2. The automobile wiring harness system of claim 1 wherein:
   the distal section further comprises a second distal opening;
   a first subset of the first plurality of individual connectors are positioned proximate to the first distal opening; and
   a second subset of the first plurality of individual connectors are positioned proximate to the second distal opening.

3. The automobile wiring harness system of claim 2 wherein the distal section comprises:
   a first diverging section extending in a first direction and comprising an opening defining the first distal opening; and
   a second diverging section extending in a second direction and comprising an opening defining the second distal opening.

4. The automobile wiring harness system of claim 3 wherein the distal section is in a Y-configuration.

5. The automobile wiring harness system of claim 3 wherein the distal section is in an L-configuration.

6. The automobile wiring harness system of claim 1 further comprising a second universal connector comprising a first end and a second end, the second universal connector being electrically coupled at the first end to the first plurality of electrical conductors proximate to the first distal opening, and the second end being configured to attach to at least one of an adapting member, a power source of the automobile, and an electrical component of the automobile; wherein the first plurality of individual connectors is coupled to the first plurality of electrical conductors at a point of coupling between the first plurality of electrical conductors and the second universal connector.

7. The automobile wiring harness system of claim 1 further comprising:
   a second plurality of electrical conductors extending from the proximal opening to the first distal opening; and
   a second universal connector comprising a first end and a second end, the first universal connector being electrically coupled at the first end to the second plurality of electrical conductors proximate to the proximal opening, and the second end being configured to attach to at least one of an adapting member, a power source of the automobile, and an electrical component of the automobile.

8. The automobile wiring harness system of claim 7 wherein:
   an electrical conductor of each of the first and second pluralities of electrical conductors is a grounding wire; and
   an individual connector of the first plurality of individual connectors is electrically coupled to the grounding wire of each of the first and second pluralities of electrical conductors.

9. The automobile wiring harness system of claim 1 wherein each of the housing and the first plurality of electrical conductors are flexible, permitting rotational displacement of the distal section relative to the proximal section.

10. The automobile wiring harness system of claim 1 further comprising:
    a second wiring harness comprising:
       a housing having a proximal section and a distal section, the proximal section comprising a proximal opening and the distal section comprising a distal opening;
       a second plurality of electrical conductors extending from the proximal opening to the distal opening;
       a second universal connector comprising a first end and a second end, the second universal connector being electrically coupled at the first end to the second plurality of electrical conductors proximate to the proximal opening, and the second end being configured to attach to at least one of an adapting member and a power source of the automobile; and
       a second plurality of individual connectors comprising a first end and a second end, each individual connector of the second plurality of individuals connectors being electrically coupled at the first end thereof to an electrical conductor of the second plurality of electrical conductors proximate to the distal opening, and the second end thereof being configured to attach to at least one of an adapting member, a power source of the automobile, and an electrical component of the automobile.

* * * * *